H. LYON.
IGNITION APPARATUS.
APPLICATION FILED MAR. 27, 1911.
1,101,648.
Patented June 30, 1914.
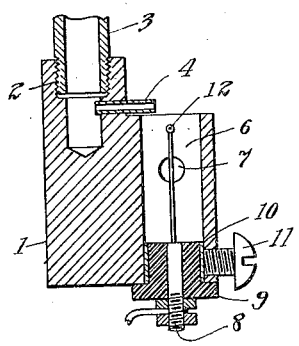
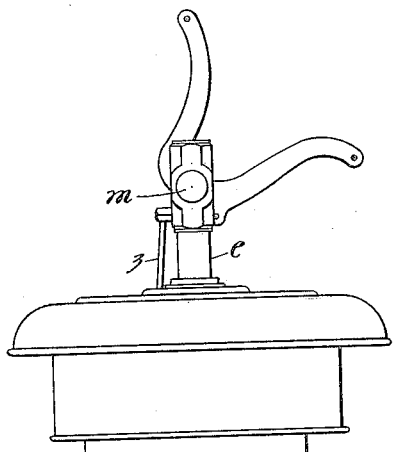
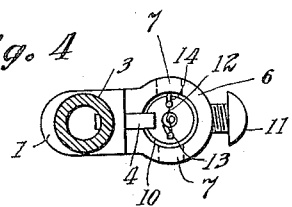
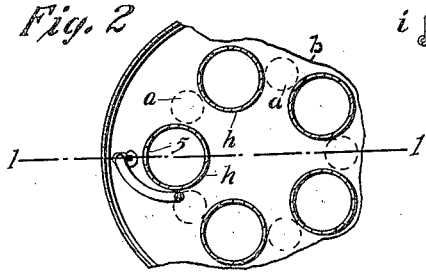
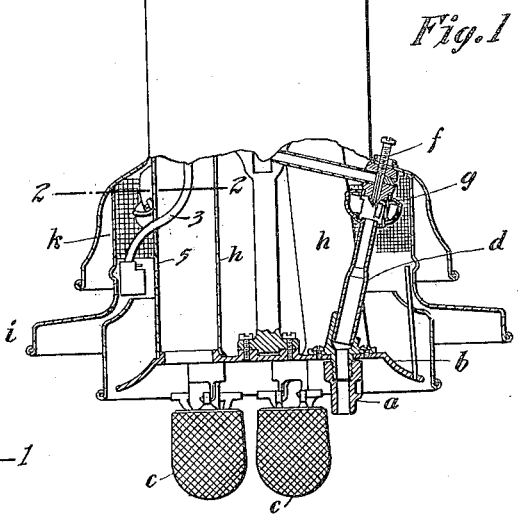
Witnesses:
Sigmund B Dressler
Frederick Bachmann
Inventor:
Howard Lyon
by DeLos Holden
his Atty.

UNITED STATES PATENT OFFICE.

HOWARD LYON, OF GLOUCESTER CITY, NEW JERSEY, ASSIGNOR TO WELSBACH LIGHT COMPANY, OF GLOUCESTER CITY, NEW JERSEY, A CORPORATION OF NEW JERSEY.

IGNITION APPARATUS.

1,101,648.  Specification of Letters Patent.  Patented June 30, 1914.

Application filed March 27, 1911. Serial No. 617,065.

*To all whom it may concern:*

Be it known that I, HOWARD LYON, a citizen of the United States, and a resident of Gloucester City, in the county of Camden and State of New Jersey, have invented certain new and useful Improvements in Ignition Apparatus, of which the following is a description.

My invention relates to apparatus for the ignition of illuminating gas or combustible vapor, and in which a filament containing platinum or a metal of the platinum group is warmed by an electric current and subjected to the catalytic action thereon of a mixture of said gas or vapor with air, preferably also in the presence of a current of pure atmospheric air as disclosed and broadly claimed in my application Serial No. 541,600 filed February 2, 1910.

At the present time the ignition of gas lamps situated out of doors is attended with great difficulty due to the presence of strong air currents and wind which cool the ignition filament or blow the gas away from it to such an extent that it has been a practical impossibility to use an igniter operating on the principle above referred to, reliance being had on constantly burning pilots which however are uneconomical on account of the substantial quantities of gas consumed thereby.

The present apparatus has been devised more particularly with reference to providing a hot wire igniter capable of reliable operation in all kinds of weather, including winds of great velocity, and being equally well adapted for use indoors and all sheltered places.

In order that the invention may be more fully understood, reference is hereby made to the accompanying drawing, of which—

Figure 1 is a side elevation of a five burner lamp, partly in section, on line 1—1 of Fig. 2. Fig. 2 is a horizontal section on line 2—2 of Fig. 1, and Fig. 3 is an enlarged vertical section and Fig. 4 a plan of the igniter of Figs. 1 and 2.

The lamp shown in the drawing comprises five burner heads $a$ depending from a deck plate $b$ and supporting inverted incandescent mantles $c$. The burner heads are supplied with gas from the Bunsen tubes $d$ radiating from a central supply pipe $e$ by which the lamp is supported, each Bunsen tube having the usual gas check $f$ and air inlets $g$ as shown. Above the burner heads $a$ and in staggered relation thereto are the five flues or stacks $h$ which have outlets (not shown) near the top of the lamp. A globe holder $i$ is also provided for supporting a hemispherical globe (not shown), the interior of the lamp being supplied with atmospheric air through the gauze $k$.

The igniter comprises a body 1 having an opening or bore 2 threaded upon the lower end of a supply pipe 3. This pipe is a pilot supplied with gas from the three-way cock $m$ whenever gas is admitted to the pipe $e$ and cut off whenever the pipe $e$ is cut off as is well known. A nozzle 4 of small bore extends laterally from the bore 2 pointing in the direction of a circular aperture 5 in one of the stacks $h$ so that its axis is approximately concentric therewith. Below the outlet of the nozzle 4 is a chamber 6 having oppositely arranged air inlets 7, said chamber being open at the top, and closed at the bottom by a plug composed of a central conductor 8, an insulator 9 and a conducting sleeve 10. A set screw 11 threaded in the wall of said chamber secures the plug in position. A conducting filament 12 of platinum or platinum alloy of minute cross section is supported at its ends by leading in wires 13 and 14 respectively, 13 being connected to the conductor 8 and 14 to the sleeve 10. This filament is preferably formed with a two or three turn helix at its center as disclosed in my application Serial No. 585,772, filed October 7, 1910. A suitable source of current such as a single dry cell (not shown) is used for energizing the filament 12 whenever ignition of the lamp is desired, any suitable switch being employed for the purpose and applied in any well known manner.

In the operation of the apparatus, the cock $m$ is turned to admit gas to the burner heads $a$ and pilot tube 3. Gas flows from the nozzle 4 in a compact jet which entrains air from the chamber 6 and through the inlets 7, causing the filament 12 to be bathed in atmospheric air. By reason of the spreading of the jet a small percentage of the gas in the lower part of the jet impinges against the outer wall of the chamber which acts as a deflector and directs some of the gas thus impinging into the vicinity of the filament whereby an ignitible mixture of gas and air surrounds the said filament. Upon closing the switch, an electric current is passed through the filament, which current is preferably of a strength insufficient of itself to heat the filament to the kindling temperature of the gas, but is sufficient to initiate catalytic action, one dry cell being sufficient for this purpose. The catalytic action of the gas upon the electrically heated filament very quickly raises it to a high temperature and ignition at once takes place, the jet from the nozzle 4 forming a tongue of flame which passes through the opening 5 into the stack $h$ and ignites the gas therein, flashing down into the lower part of the lamp and burning at all of the burner heads $a$ in the usual manner. The electric current is then cut off, while the jet from nozzle 4 may be allowed to burn, as its consumption is negligible compared with that of the lamp proper, the pilot being shut off by the cock $m$ whenever the lamp itself is extinguished. Obviously the ignition means herein disclosed is not limited to lamps of the class shown, but may be used for igniting any lamp employing gas or combustible vapor, whether incandescent mantles be used or not.

Having now described my invention, what I claim is:

1. A gas lamp comprising a burner head support, a burner head depending therefrom, a flue above said support and communicating with the space below the support, an opening in said flue, a pilot, the jet from which is projected through said opening into said flue, and means for igniting said pilot, said means comprising a filament and connections for applying an electric current thereto, substantially as described.

2. A gas lamp comprising a burner head support, a burner head depending therefrom, a flue above said support and communicating with the space below the support, an opening in said flue, a pilot, the jet from which is projected through said opening into said flue, and means for igniting said pilot, substantially as described.

3. An igniter comprising a gas supply having means for producing a jet, an ignition chamber situated out of alinement with the major portion of said jet, a filament within said ignition chamber, means for applying an electric current thereto, and means within the path of said jet for deflecting only a portion thereof into the ignition chamber, substantially as described.

4. An igniter comprising a gas supply having means for producing a jet, an ignition chamber situated out of alinement with the major portion of said jet, a filament within said ignition chamber, means for applying an electric current thereto, a portion of the wall of said chamber being so situated as to extend into the path of some of the gas composing said jet so as to deflect the same into the vicinity of the filament, substantially as described.

5. An igniter comprising a gas supply having means for producing a jet, an ignition chamber situated out of alinement with the major portion of said jet, a filament within said ignition chamber, means for applying an electric current thereto, means within the path of said jet for deflecting only a portion thereof into the ignition chamber, and one or more inlets formed in the said chamber adjacent said filament, substantially as described.

6. An igniter comprising an ignition tube having an open end, a gas supply tube at right angles to said ignition tube and immediately beyond said open end, a filament in said ignition chamber and means for applying an electric current thereto.

7. An igniter comprising an ignition chamber in the form of a tube having an open end, ignition means situated within said tube, one or more air inlets in the wall of said tube, and a gas supply tube arranged transversely to the axis of said tubular chamber adjacent and beyond the open end thereof.

8. A gas lamp comprising a burner having a flue, an opening in said flue, a pilot the jet from which is projected through said opening, an ignition chamber having a filament, means for applying an electric current thereto, and means within the path of said jet for deflecting a portion thereof into the vicinity of said filament.

9. A gas lamp comprising a burner having a flue, an opening in said flue, a pilot the jet from which is projected through said opening, an ignition chamber having a filament and one or more air inlets, means for applying an electric current to said filament, and means within the path of said jet for deflecting a portion thereof into the vicinity of said filament.

10. An igniter comprising an ignition chamber having an opening, a gas tube adjacent said opening and exterior to said chamber, the jet from said tube being projected across said opening and sufficiently close thereto to cause a portion of the gas to enter said opening, a filament in said ignition chamber, and means for applying an electric current thereto.

11. An igniter comprising an ignition chamber having one or more air inlets and an opening separate therefrom, a gas tube adjacent said opening and exterior to said chamber, the jet from said tube being projected across said opening and sufficiently close thereto to cause a portion of the gas to enter said opening, a filament in said ignition chamber, and means for applying an electric current thereto.

This specification signed and witnessed this 20th day of March 1911.

HOWARD LYON.

Witnesses:
J. H. JOHNSON,
A. G. HENSEL, Jr.

Copies of this patent may be obtained for five cents each, by addressing the "Commissioner of Patents, Washington, D. C."